(12) United States Patent
Kamath

(10) Patent No.: US 8,953,084 B2
(45) Date of Patent: Feb. 10, 2015

(54) PLURAL FOCAL-PLANE IMAGING

(75) Inventor: Ajith Kamath, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 55 days.

(21) Appl. No.: 13/483,874

(22) Filed: May 30, 2012

(65) Prior Publication Data

US 2013/0321668 A1 Dec. 5, 2013

(51) Int. Cl.
*H04N 5/225* (2006.01)
*G02B 13/16* (2006.01)

(52) U.S. Cl.
USPC ........................................................ 348/335

(58) Field of Classification Search
USPC ............... 348/240.3, 262, 335, 340, 343; 359/399, 401, 402, 403, 732, 850, 857, 359/864
See application file for complete search history.

(56) References Cited

U.S. PATENT DOCUMENTS

| | | | |
|---|---|---|---|
| 4,101,195 A * | 7/1978 | Krosch et al. ................. | 600/166 |
| 5,051,830 A | 9/1991 | von Hoessle | |
| 6,036,324 A * | 3/2000 | Bernacki et al. ............... | 359/859 |
| 6,593,561 B2 * | 7/2003 | Bacarella et al. ........... | 250/208.1 |
| 6,975,353 B1 * | 12/2005 | Milinusic et al. .......... | 348/218.1 |
| 7,453,517 B2 * | 11/2008 | Fujimoto et al. ............... | 348/374 |
| 7,486,438 B2 | 2/2009 | Bergeron et al. | |
| 7,586,678 B2 * | 9/2009 | Bergeron et al. ............. | 359/420 |
| 7,764,440 B2 * | 7/2010 | Border et al. ................. | 359/721 |
| 7,812,869 B2 * | 10/2010 | Boettiger ...................... | 348/262 |
| 8,638,387 B2 * | 1/2014 | Aizpuru et al. ............... | 348/344 |
| 2008/0239088 A1 | 10/2008 | Yamashita | |
| 2009/0168190 A1 | 7/2009 | Imaoka et al. | |
| 2010/0214468 A1 | 8/2010 | Caron | |
| 2013/0041226 A1 * | 2/2013 | McDowall .................... | 600/166 |

FOREIGN PATENT DOCUMENTS

GB 1513314 6/1978

* cited by examiner

*Primary Examiner* — Aung S Moe
*Assistant Examiner* — Chriss Yoder, III
(74) *Attorney, Agent, or Firm* — Digimarc Corporation

(57) ABSTRACT

An imaging system captures focused imagery from two or more focal planes, yet does so with relatively simple optical elements. Some arrangements involve folded optical paths, to make them more compact in size. Others enable the image sensors to be mounted in coplanar arrangement. Still others involve digital compositing, e.g., to mitigate undesired bokeh effects. A great variety of other features and arrangements are also detailed.

10 Claims, 3 Drawing Sheets

PLURAL FOCAL-PLANE IMAGING

TECHNICAL FIELD

The present technology concerns imaging systems.

INTRODUCTION

Various arrangements are known that integrate telephoto and wide angle optical systems into a single apparatus—either using a single image sensor, or two image sensors. Examples are shown in U.S. Pat. Nos. 5,051,830, and 7,486,438, and in patent publication 20100214468. However, the twin optical systems in these arrangements typically capture imagery from a single focal plane.

U.S. Pat. No. 7,764,440 discloses technology for capturing imagery from two focal planes simultaneously. However, the detailed arrangements have disadvantages which make them ill-suited for certain applications.

Cameras are commercially available, from Lytro and Pelican Imaging, that allow users to change the focus of a picture after it has been captured. (Such cameras employ plenoptic and light field sensing.) While advantageous in many respects, such arrangements require complex image sensors and image processing.

In some applications, it would be advantageous to relax the single focal plane restriction of conventional cameras, without the complexity of plenoptic/light field approaches, and without drawbacks of other art.

According to one embodiment of the present technology, a camera captures focused imagery from two or more focal planes, yet does so with relatively simple optical elements. Some arrangements involve folded optical paths, to make them more compact in size. Others enable the image sensors to be mounted in coplanar arrangement. Still others involve digital compositing, e.g., to mitigate undesired bokeh effects.

The foregoing and additional features and advantages of the present technology will be more readily apparent from the following detailed description, which proceeds with reference to the accompanying drawings.

DETAILED DESCRIPTION

Figure 1:
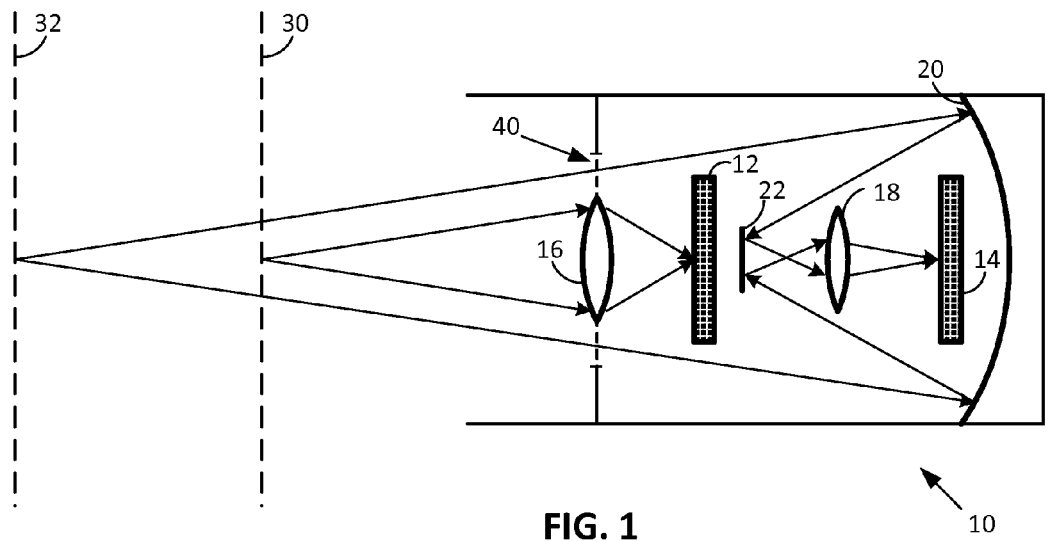
FIGS. 1-6 illustrate sample implementations incorporating aspects of the present technology.

Referring to FIG. 1, an illustrative camera apparatus 10 includes first and second image sensors 12 and 14, first and second light-transmitting lenses 16 and 18, and first and second mirrors (reflectors) 20 and 22. These elements cooperate to define two collinear imaging systems—each with a respective optical path.

The first imaging system comprises first sensor 12, and first lens 16. These elements cooperate to capture an image that is projected onto the first sensor from a first focal plane 30.

The second imaging system comprises second sensor 14, and first and second mirrors 20 and 22. These elements cooperate to capture an image that is projected onto the second sensor 14 from a second focal plane 32. (While mirror 22 is shown as planar, it can take various forms depending on the particular design, e.g., parabolically curved (Gregorian), hyperbolically curved (Casssegrain), spherically curved, etc.)

As can be seen, the two focal planes 30 and 32 are parallel and spaced-apart. Both lie on the left side of lens 16 in this illustration, while the other noted elements lie on the right side of lens 16. (This document adopts the convention that "focal plane" refers to the plane—outside the camera—in which a subject is found. A focused image of this subject is produced inside the camera at an "image plane"—where a sensor is typically located. The FIG. 1 embodiment thus has two focal planes and two image planes.)

The distance between the focal planes is a matter of design choice. In one embodiment, the first focal plane 30 may be 6 inches from lens 16, while the second focal plane 32 may be 60 inches away (e.g., a 10× difference). In other embodiments, the two focal planes may be separated by a few inches, or may be hundreds of feet apart.

In the depicted embodiment, lenses 16 and 18, mirrors 20 and 22, and sensors 12 and 14 are co-linear. That is, a surface normal passing through the center of each of these elements (e.g., through the optical axis of each lens) also passes through the center of each of the other elements.

While simple, thin lenses are shown for clarity of illustration, in some embodiments more complex arrangements, e.g., including compound lenses, will be employed. Naturally, the different optical components and arrangements can have different optical powers/magnifications. For example, the first optical arrangement can have a first optical power, and the second optical arrangement can have a second optical power that is greater than, less than, or equal to the first optical power.

Figure 2:
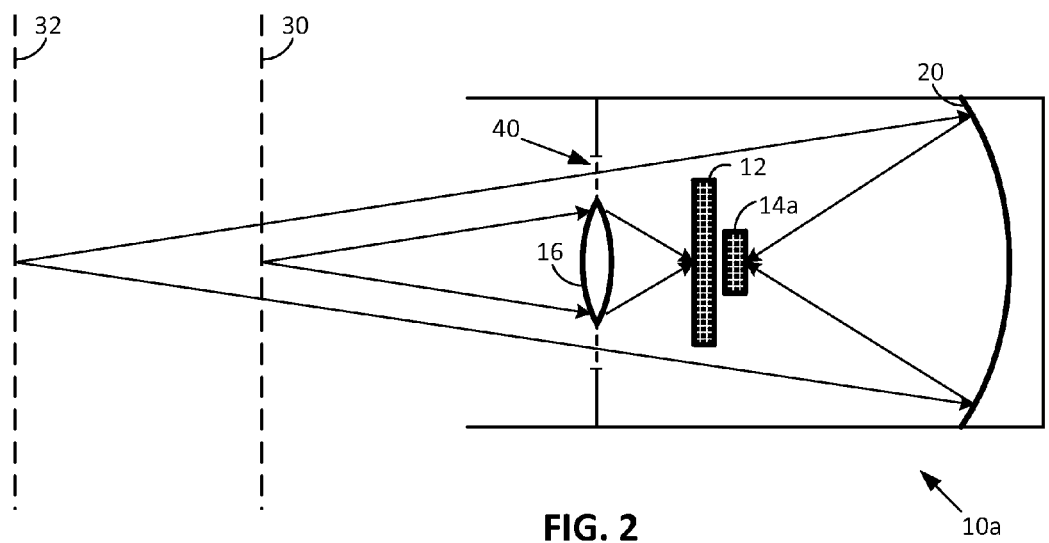

In a variant arrangement 10a, shown in FIG. 2, second mirror 22 and second lens 18 are omitted. Instead, the second image sensor (14a) is placed in the position of mirror 22 in FIG. 1. The curvature of first mirror 20 is adjusted to focus the image from the second focal plane 32 onto this second image sensor.

In this second embodiment, it will be recognized that the second image sensor 14a is smaller in size than the first image sensor 12, and faces the back of the camera (i.e., it faces mirror 20). In contrast, the first image sensor 12 faces the front of the camera (i.e., it faces lens 16). In this arrangement, the two image sensors are disposed back-to-back.

(While sensor 14a in FIG. 2 is physically smaller than sensor 12, both sensors may have the same resolution, such as 1600×1200 pixels, in which case the size of the component pixels will be smaller in sensor 14a. Alternatively, one sensor (typically sensor 14a) may comprise fewer pixels than sensor 12.)

Figure 3:
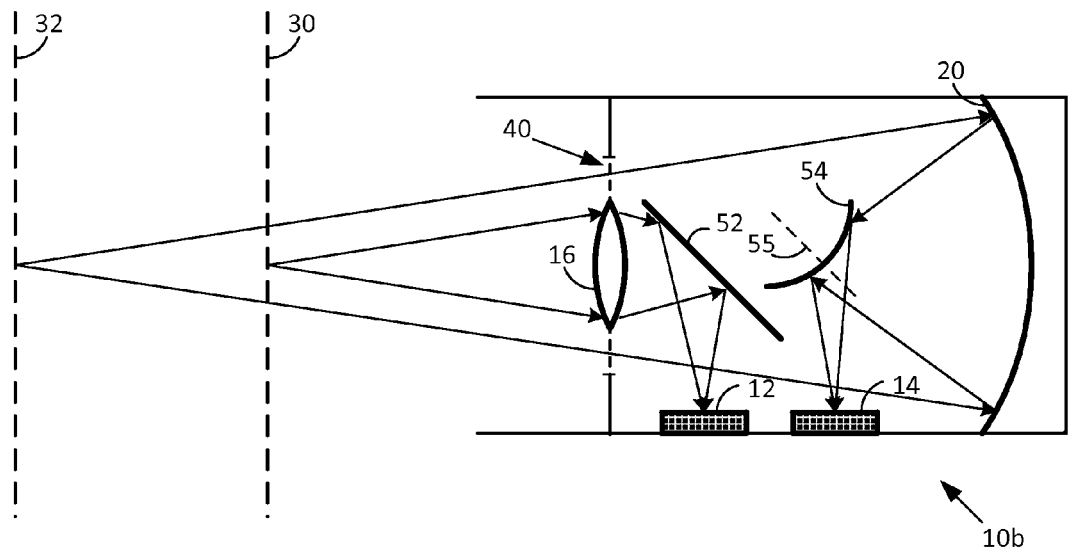

FIG. 3 shows another variant arrangement 10b. In this configuration, lens 16 projects the image from first focal plane 30 onto an inclined mirror 52, which reflects the image onto the first sensor 12. The curved reflector 20 reflects the image from second focal plane 32 onto a convex-curved mirror 54, which reflects the image onto the second sensor 14. (Mirror 54 may be, e.g., parabolically curved (Gregorian), hyperbolically curved (Cassegrain), or spherically curved. In the configuration shown, its central axis 55 is non-parallel to the central/optical axis of the lens 16 and the reflector 20.) In the FIG. 3 arrangement, sensors 12 and 14 are coplanar.

Figure 4:
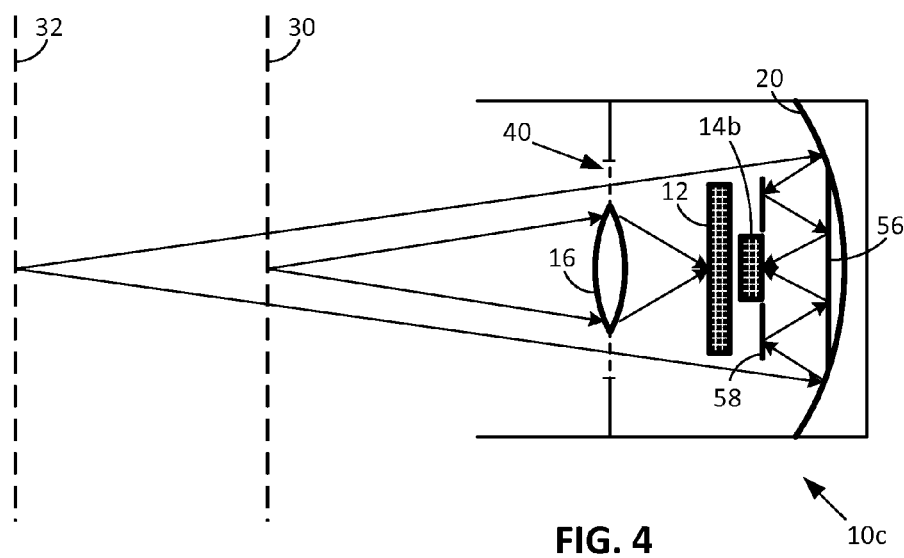

FIG. 4 shows still another variant arrangement 10c. In this configuration, reflector 20 includes a curved outer annular portion, and also includes a planar portion 56 across a central region. Reflector 20 cooperates with a parallel reflector 58 to reflect light twice or more before it strikes the second sensor 14b. This configuration effects a folding of the optical path, resulting in a smaller camera. (A related multiply-reflective arrangement is shown in U.S. Pat. No. 7,898,749.)

It will be recognized that each of the above-described arrangements employs a two-part light gathering aperture. This aperture includes the first lens 16 (disposed in a central region of the aperture), and an optically-transparent portion 40 in a peripheral (here annular) region. Planar glass or an air void can occupy this transparent portion.

(Naturally, struts or other mechanism are often provided to position lens 16 in the aperture; these may pass through the peripheral region. Supporting structures are also needed for the other depicted elements. Such details are omitted from the figures for clarity of illustration.)

Put another way, the depicted arrangements include two concentric (or coaxial) apertures, through which light is introduced to the camera. In the particular arrangements shown, these apertures are coplanar.

(It should be understood that the drawings are not to scale, and that the optical elements are shown schematically, rather than with their correct optical curvatures.)

The image sensors in the depicted embodiments can each comprise a conventional CMOS or CCD photosensor array, optionally including color Bayer filters. Such sensors are widely available, including from Aptina Imaging Corp. Alternatively, other optical sensor technologies can be employed, such as those employing stacked photosensors. Sensors of the latter type are available from Foveon, Inc.

CONCLUDING REMARKS

It will be recognized that the depicted arrangements capture multiple planes of imagery, without the complexity of plenoptic/light field approaches.

Figure 5:
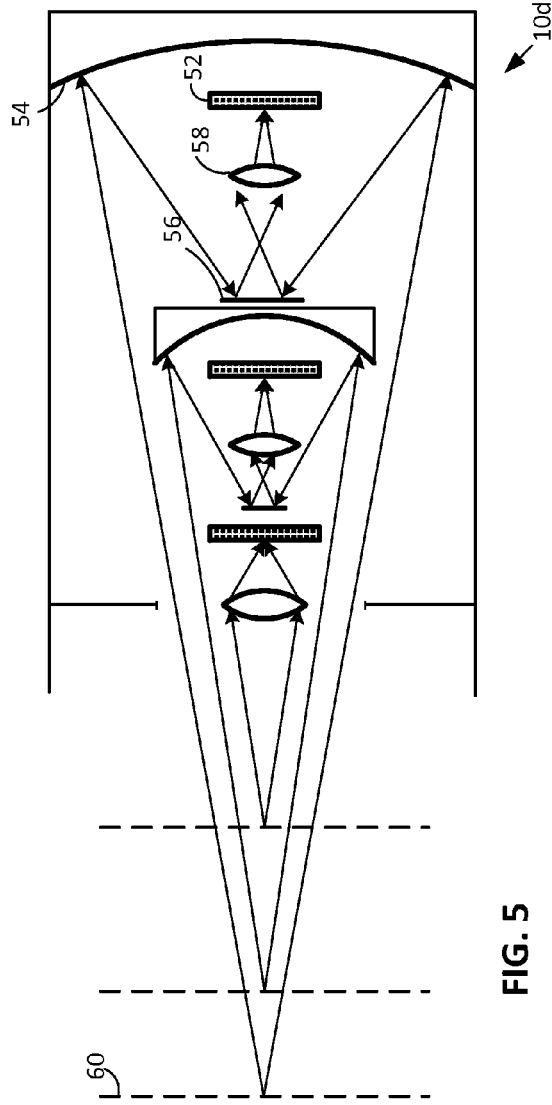

While described in the context of arrangements with two different focal planes, the same principles can be extended to yield systems with three or more distinct focal planes. For example, multiple imaging systems can be nested or otherwise cascaded, each with its own associated sensor and focal plane. FIG. 5 shows one of many such implementations.

The FIG. 5 arrangement 10d is an extension of the FIG. 1 arrangement, augmented with a further image sensor 52, a pair of reflectors 54, 56, and a lens 58. These elements cooperate to focus an image from a third focal plane 60 onto the image sensor 52.

Similarly, while the aperture 40 in the illustrated arrangements is an air opening, other treatments can be used, such as a glass shell, a corrector plate lens, a meniscus corrector shell, an annular lens, or other shaped glass. (Related arrangements are known, e.g., in the Schmidt-Cassegrain and Maksutov-Cassegrain telescopes.)

Artisans will appreciate that the illustrated arrangements are subject to countless variations. These include incorporation of known arrangements to vary focus, incorporation of other optical path folding arrangements to reduce the depth of the apparatus (e.g., to make such technology suitable for inclusion in mobile phone devices), introduction of one or more polarizing filters between any of the depicted optical elements, inclusion of lenticular lens arrays in front of either or both of the image sensors (e.g., if plenoptic/light field sensing is desired), addition of others lenses and reflectors, incorporation of one or more electro-optic shutters and beam-splitters, etc.

Through use of such known technology, another variant implementation can capture imagery from an optical plane 30 or 32 (or both) that is non-parallel to lens 16.

Similarly, through use of electro-optic shutter- and/or beam splitter-elements, it is possible to design the imaging system to project imagery from two different focal planes onto a single image sensor.

As indicated, principles of the present technology can also be used in systems employing plenoptic/light field technology. Such technology is detailed in patent publications of Lytro and Pelican Imaging, including 20110122308, 20110080487, 20110069189, 20070252074, 20080266655, 20100026852, 20100265385 and 20080131019.

While the detailed arrangements are naturally useful with consumer cameras and smartphones, they also can be employed in other imaging systems—such as telescopes and microscopes. Moreover, while useful with visible light, the same principles can also be used in connection with electromagnetic waves of any wavelength, such as infrared and ultraviolet. Still further, the technology can also be used with acoustic waves, such as in sonar apparatus. (The term "signal sensor" may be used to encompass all such detectors of wave-based signals, including CCD and CMOS image sensors, microphones, etc.)

If a lens/mirror arrangement is employed that results in projection of an image of non-uniform brightness across a photosensor array (e.g., due to certain areas of the sensor being illuminated by larger reflection surfaces than other areas), such variation can be redressed by changing the gain settings of the different photosensors comprising the sensor array in a compensatory manner.

The details of digital imaging are familiar to artisans, so are not belabored here. Suffice it to say that the depicted image sensors are each coupled to a processing unit with associated memory. Software instructions stored in the memory configure the processing unit to perform desired processing of the signals from the sensors, and the resulting, processed image data is typically then stored back into that memory (or into another). One form of software processing is to combine the image data captured by the first and second sensors (and third sensor) into a composite image, e.g., choosing—for each region of pixels within a desired field of view—from either the first or second (or third) image sensor data, depending on which is most in focus (i.e., which exhibits the highest local contrast, or other focus metric).

Figure 6:
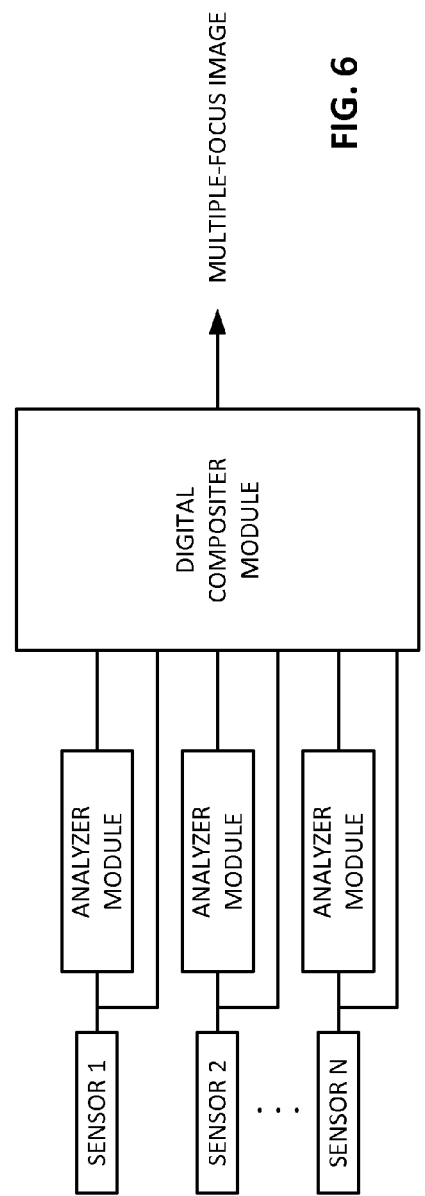

FIG. 6 shows such an arrangement. Frames of pixel data are provided by different sensors to respective analyzer modules. (Plural analyzer modules are shown, but in actual implementation, a single software-implemented routine executed by a programmable processor and applied to different frames of input imagery can be employed.) The analyzer modules output a local contrast map for each frame of pixel data. A digital compositor module (which can again be a software-implemented routine executed by a programmable processor) takes the local contrast maps, and determines—for each 5×5 pixel block in the image—which of the image frames has the highest contrast. The compositor then assembles pixel data from these highest contrast blocks into a finished image.

Artisans will recognize that occluded mirror-based imaging systems (e.g., the second optical arrangement in FIG. 1) are sometimes disfavored because the blocked central aperture of such configurations commonly produces undesirable bokeh effects, such as donut ring artifacts, or false detail, in out-of-focus areas. In embodiments of the present technology, in contrast, such artifacts can be mitigated by digitally compositing—in such regions of the image—pixel detail from a companion optical arrangement (e.g., the first optical arrangement in FIG. 1), which exhibits a more uniform, softer out-of-focus image blur. In one such embodiment, the analyzer modules of FIG. 6 are configured to also sense the presence of undesired artifacts (e.g., by applying a Hough method to detect a donut artifact). In such regions the analyzer module can output a signal indicating low local contrast, so the compositer module will avoid including imagery from such region in the composite image frame.

In the interest of conciseness, the myriad variations and combinations of the described technology are not cataloged in this document. Applicant recognizes and intends that the concepts of this specification can be combined, substituted and interchanged—both among and between themselves, as well as with those known from the prior art. Moreover, it will be recognized that the detailed technology can be included with other technologies—current and upcoming—to advantageous effect.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

Having described and illustrated the principles of the technology with reference to specific implementations, it will be recognized that the technology can be implemented in many other, different, forms. Accordingly, I claim as my invention all such arrangements as may come within the scope and spirit of the following claims, and equivalents thereof.

I claim:

1. An apparatus comprising:
    first and second image sensors;
    a first optical arrangement, including at least a first lens, the first optical arrangement serving to focus a first image from a first focal plane on the first image sensor; and
    a second optical arrangement, including at least a first reflector, the second optical arrangement serving to focus a second image from a second focal plane on the second image sensor;
    wherein a portion of the first optical arrangement partially occludes an optical path to the second image sensor and wherein the first focal plane is different than the second focal plane, and wherein the second optical arrangement further includes a curved reflector having a central axis that is non-parallel to a central axis of the first lens, and an image plane of the second image sensor is non-parallel to the second focal plane; and
    wherein the curved reflector is a convex reflector which is configured to reflect light directly onto the second image sensor.

2. The apparatus of claim 1 in which the first and second image sensors are coplanar.

3. The apparatus of claim 1 that further includes a third optical arrangement, the third optical arrangement including a third image sensor on which a third image from a third focal plane is focused, the third focal plane being different than the first and second focal planes.

4. The apparatus of claim 1, wherein the first reflector is a concave reflector.

5. The apparatus of claim 4, wherein the second optical arrangement is configured such that the first reflector reflects light directly onto the curved reflector.

6. The apparatus of claim 1, wherein the first optical arrangement includes a second reflector.

7. The apparatus of claim 6, wherein the second reflector is disposed in an optical path to the first image sensor at a location between the first lens and the first image sensor.

8. The apparatus of claim 7, wherein the first optical arrangement is configured such that the second reflector reflects light directly onto the first image sensor.

9. The apparatus of claim 6, wherein the second reflector is a planar reflector.

10. The apparatus of claim 1, wherein an image plane of the first image sensor is parallel to the image plane of the second image sensor.

* * * * *